(12) United States Patent
Yannuzzi et al.

(10) Patent No.: US 12,417,312 B2
(45) Date of Patent: Sep. 16, 2025

(54) CONSTRAINT-BASED TRAINING DATA GENERATION

(71) Applicant: Cisco Technology, Inc., San Jose, CA (US)

(72) Inventors: Marcelo Yannuzzi, Vufflens-la-Ville (CH); Benjamin William Ryder, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 271 days.

(21) Appl. No.: 18/106,600

(22) Filed: Feb. 7, 2023

(65) Prior Publication Data

US 2024/0265138 A1  Aug. 8, 2024

(51) Int. Cl.
*G06F 21/00* (2013.01)
*G06F 21/62* (2013.01)

(52) U.S. Cl.
CPC ........ *G06F 21/6254* (2013.01); *G06F 21/629* (2013.01)

(58) Field of Classification Search
CPC .......................... G06F 21/6254; G06F 21/629
See application file for complete search history.

(56) References Cited

U.S. PATENT DOCUMENTS

| | | | |
|---|---|---|---|
| 7,844,582 B1 * | 11/2010 | Arbilla | G06F 21/554 |
| | | | 707/754 |
| 9,396,237 B1 * | 7/2016 | Shah | G06Q 10/10 |
| 11,044,154 B2 * | 6/2021 | Hockett | H04L 67/30 |
| 11,188,517 B2 | 11/2021 | Banipal et al. | |
| 11,531,904 B2 * | 12/2022 | Callcut | G06F 21/602 |
| 11,562,134 B2 * | 1/2023 | Mane | G06F 40/284 |
| 11,605,038 B1 * | 3/2023 | Jain | G06Q 10/06313 |
| 11,663,486 B2 * | 5/2023 | Sun | G06N 3/045 |
| | | | 706/12 |
| 11,711,422 B1 * | 7/2023 | Jain | H04L 67/535 |
| | | | 709/203 |
| 11,755,559 B1 * | 9/2023 | Tankersley | G06F 16/2358 |
| | | | 707/694 |

(Continued)

FOREIGN PATENT DOCUMENTS

WO  2021138163  7/2021

OTHER PUBLICATIONS

Collibra: Data Catalog, Data Governance & Data Quality, online: https://www.collibra.com/us/en, accessed Jan. 5, 2023, 7 pages.

(Continued)

*Primary Examiner* — Don G Zhao
(74) *Attorney, Agent, or Firm* — Lee & Hayes, P.C.; James M. Behmke

(57) ABSTRACT

In one embodiment, a device may receive a request for training data that is based on application data generated by an application executed at a data collection node, wherein the application data is associated with metadata identifiers. The device may determine one or more training data constraints that restrict use of the application data as training data. The device may generate the training data in part by excluding application data of a particular type from being included in the training data based on a match between its metadata identifier and the one or more training data constraints. The device may provide the training data to be used to train a machine learning model.

20 Claims, 9 Drawing Sheets

(56) References Cited

U.S. PATENT DOCUMENTS

| | | | |
|---|---|---|---|
| 12,175,504 B2* | 12/2024 | Zheng | G06Q 30/0282 |
| 2008/0040151 A1* | 2/2008 | Moore | G16H 40/67 |
| | | | 705/2 |
| 2010/0023546 A1* | 1/2010 | Silsby | G06F 16/283 |
| | | | 707/E17.005 |
| 2010/0174608 A1* | 7/2010 | Harkness | G06F 21/10 |
| | | | 726/26 |
| 2017/0323110 A1* | 11/2017 | Griffith | G06F 21/6245 |
| 2018/0341855 A1* | 11/2018 | Childress | G06V 10/764 |
| 2019/0129832 A1 | 5/2019 | Budnik et al. | |
| 2019/0197364 A1* | 6/2019 | Cheng | G06F 16/113 |
| 2019/0253311 A1* | 8/2019 | Hockett | H04L 41/5041 |
| 2019/0286942 A1* | 9/2019 | Abhiram | G06F 18/2148 |
| 2020/0133964 A1* | 4/2020 | Lee | G06F 16/355 |
| 2020/0150832 A1* | 5/2020 | Winn | A61K 39/39566 |
| 2020/0151577 A1* | 5/2020 | Ogawa | G06Q 20/4016 |
| 2020/0302231 A1* | 9/2020 | Nawhal | G06F 18/211 |
| 2020/0311300 A1* | 10/2020 | Callcut | G06N 5/02 |
| 2020/0342059 A1* | 10/2020 | Ziuzin | G06F 40/211 |
| 2020/0396141 A1* | 12/2020 | Sundararajan | H04L 67/63 |
| 2021/0042291 A1* | 2/2021 | Banipal | G06N 5/02 |
| 2021/0049128 A1* | 2/2021 | Kernick | H04L 67/01 |
| 2021/0073977 A1* | 3/2021 | Carter | G06T 11/20 |
| 2021/0074425 A1* | 3/2021 | Carter | G06N 20/00 |
| 2021/0193297 A1* | 6/2021 | Buckland | G16H 40/20 |
| 2021/0294403 A1* | 9/2021 | Calugaru | G06N 3/044 |
| 2021/0403004 A1* | 12/2021 | Alvarez | G06V 20/597 |
| 2021/0406716 A1* | 12/2021 | Broyles | G06F 40/174 |
| 2022/0198562 A1* | 6/2022 | Cella | G06Q 40/04 |
| 2022/0247760 A1* | 8/2022 | Shanker | G06F 9/45558 |
| 2022/0329493 A1* | 10/2022 | Hong | G06F 16/2458 |
| 2023/0034071 A1* | 2/2023 | Whitehill | A61B 5/742 |
| 2023/0068513 A1* | 3/2023 | Kundu | G06N 5/022 |
| 2023/0121209 A1* | 4/2023 | Hwang | G06F 18/23213 |
| | | | 706/12 |
| 2023/0133033 A1* | 5/2023 | Zimmermann | G06N 3/08 |
| | | | 726/19 |
| 2023/0153870 A1* | 5/2023 | Zheng | G06N 3/088 |
| | | | 705/26.7 |
| 2023/0205917 A1* | 6/2023 | Chalk | G06F 21/6245 |
| | | | 726/30 |
| 2023/0342216 A1* | 10/2023 | Ezrielev | G06F 16/906 |
| 2023/0368013 A1* | 11/2023 | Councill | G06N 3/088 |
| 2023/0393871 A1* | 12/2023 | Religa | G06F 9/453 |
| 2023/0419119 A1* | 12/2023 | Lal | G06N 20/20 |
| 2024/0221892 A1* | 7/2024 | Shelton, IV | G16H 15/00 |
| 2024/0221893 A1* | 7/2024 | Shelton, IV | G16H 10/60 |
| 2024/0221923 A1* | 7/2024 | Shelton, IV | G16H 20/40 |
| 2024/0221937 A1* | 7/2024 | Shelton, IV | G16H 20/40 |
| 2024/0242018 A1* | 7/2024 | Narayanan | G06F 40/166 |
| 2024/0281710 A1* | 8/2024 | Rao | G06N 20/00 |
| 2024/0296654 A1* | 9/2024 | Alwanni | G06V 10/774 |

OTHER PUBLICATIONS

Gaia-X, online: https://gaia-x.eu/, accessed Jan. 5, 2023, 5 pages.

Google Distrubuted Cloud, online: https://cloud.google.com/distributed-cloud, accessed Jan. 4, 2022, 11 pages.

InCountry, One World, One App, online: https://incountry.com/, accessed Jan. 4, 2022, 3 pages.

Kurian, Thomas, "Engaging in a European dialogue on customer controls and open cloud solutions", online: https://cloud.google.com/blog/products/identity-security/how-google-cloud-is-addressing-data-sovereignty-in-europe-2020, Sep. 2020, accessed Jan. 4, 2023, 4 pages.

Logicgate, online: https://www.logicgate.com/, accessed Jan. 4, 2023, 10 pages.

OneTrust, online: https://www.onetrust.com/, accessed Jan. 4, 2023, 6 pages.

OVHcloud, online: https://us.ovhcloud.com/, accessed Jan. 4, 2023, 11 pages.

RegTech100, online: https://fintech.global/regtech100/, accessed Jan. 4, 2023, 12 pages.

Zenity, online: https://www.zenity.io/, accessed Jan. 5, 2023, 3 pages.

* cited by examiner

CONSTRAINT-BASED TRAINING DATA GENERATION

TECHNICAL FIELD

The present disclosure relates generally to constraint-based training data generation.

BACKGROUND

Applications operate by handling data. For instance, executing an application can involve the storage, communication, processing, etc. of various types of data. The various types of data may include data whose handling is subject to various regulations. For example, data handling regulations at national, federal, state, industry, and/or organizational levels may be applicable to the data handled by an application. The enforcement of data compliance has only been made more complex and potential violations made more likely as applications are increasingly being developed as a set of distributed services running across a mix of multi-cloud and edge infrastructures and handling a mix of data types differentially subject to various regulations.

For most organizations, the collection, use, and analysis of their data is crucial. For example, many organizations use data analysis and/or the use of production data to develop and train machine learning models that can be used to improve their operations and/or offer additional services or products.

Unfortunately, collection and use of application data for model training largely occurs non-specifically and in a programmatic blind-spot with respect to enforcement of data compliance requirements. Therefore, given the current regulatory environment and trends, continuing to treat data compliance as an afterthought with respect to the collection and use of application data for model training will likely yield increased violations of data compliance regulations which may result in substantial fines, penalties, and/or other negative impacts to data handlers.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
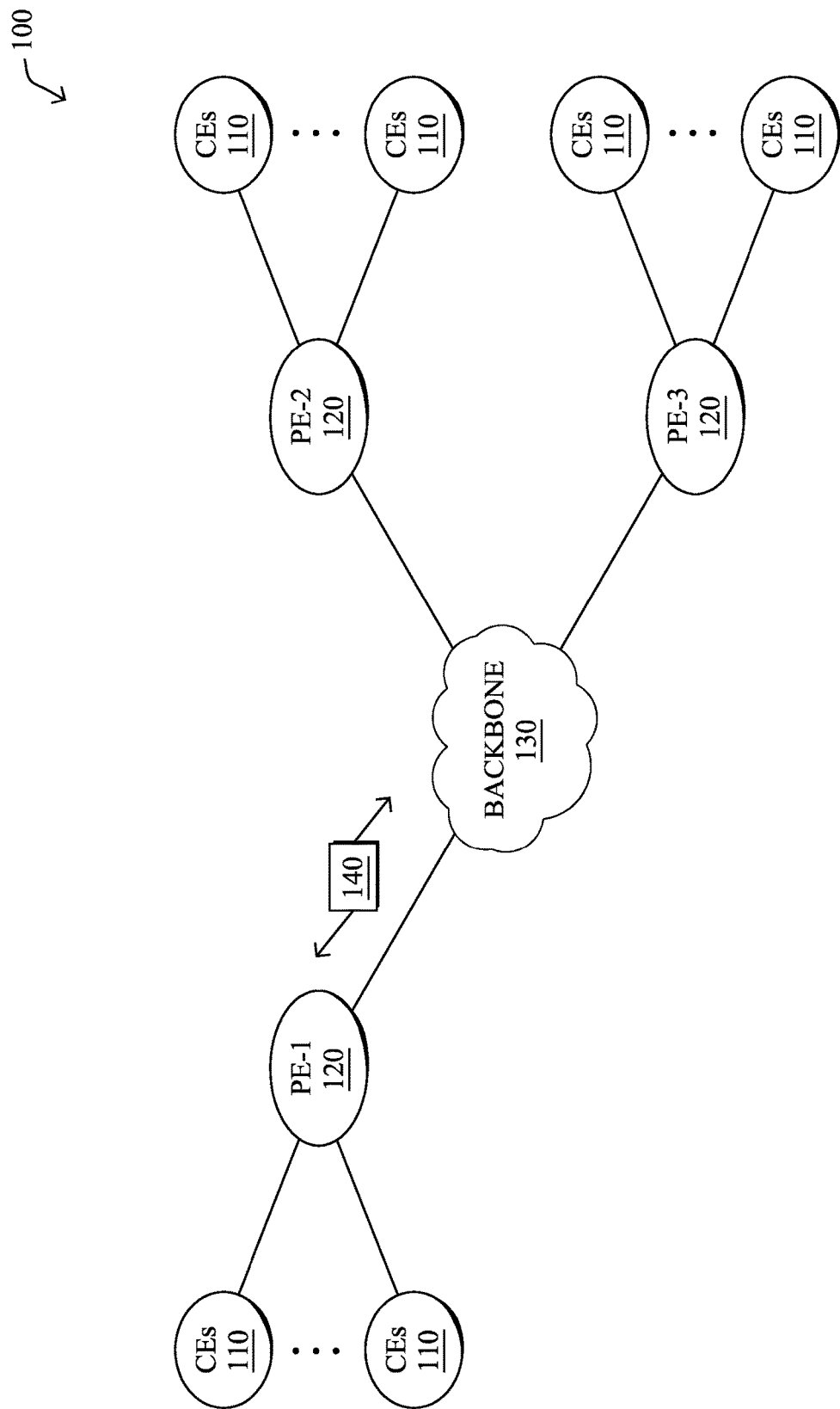
FIGS. 1A-1B illustrate an example communication network.

According to one or more embodiments of the disclosure, a device may receive a request for training data that is based on application data generated by an application executed at a data collection node, wherein the application data is associated with metadata identifiers. The device may determine one or more training data constraints that restrict use of the application data as training data. The device may generate the training data in part by excluding application data of a particular type from being included in the training data based on a match between its metadata identifier and the one or more training data constraints. The device may provide the training data to be used to train a machine learning model.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
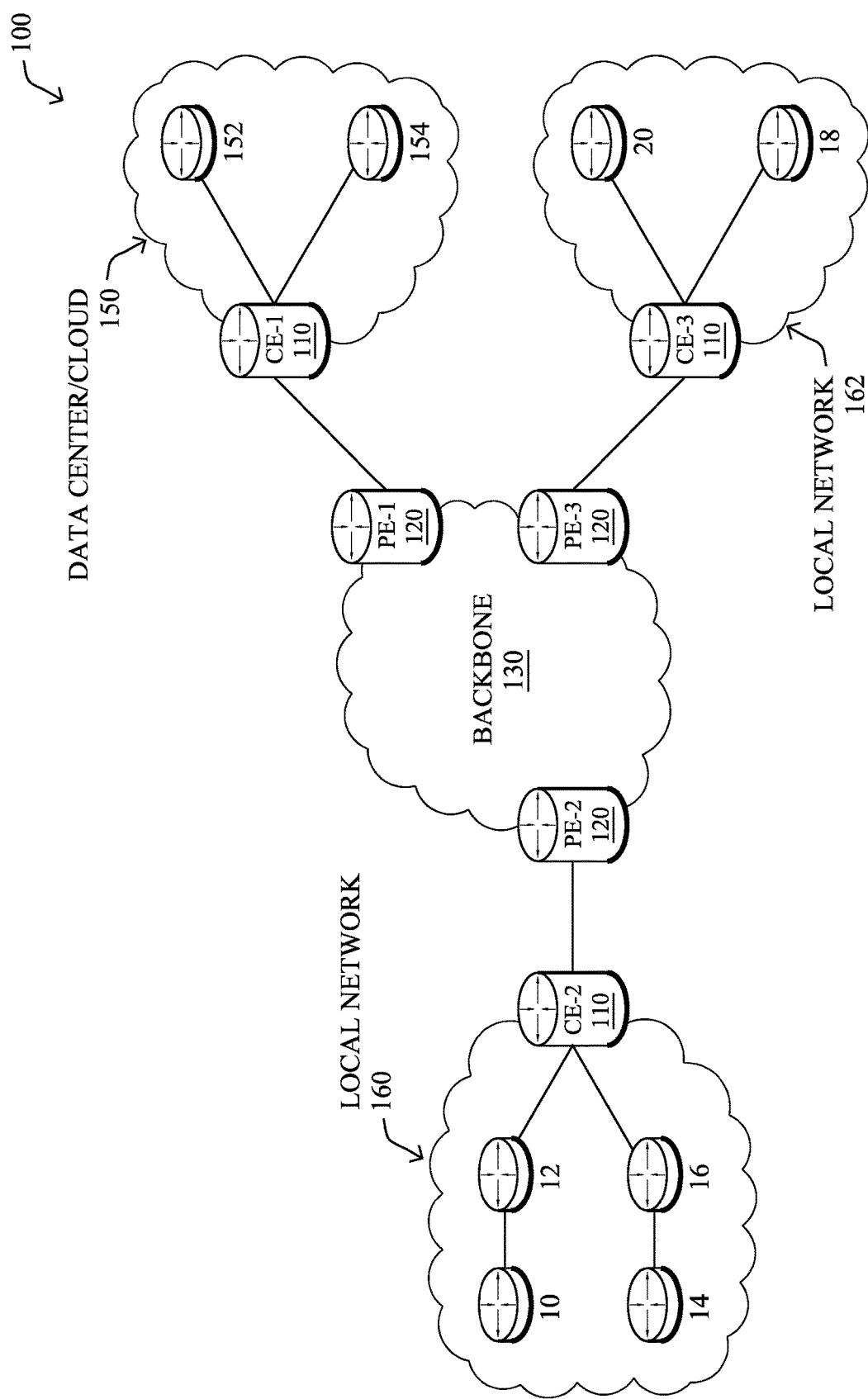

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
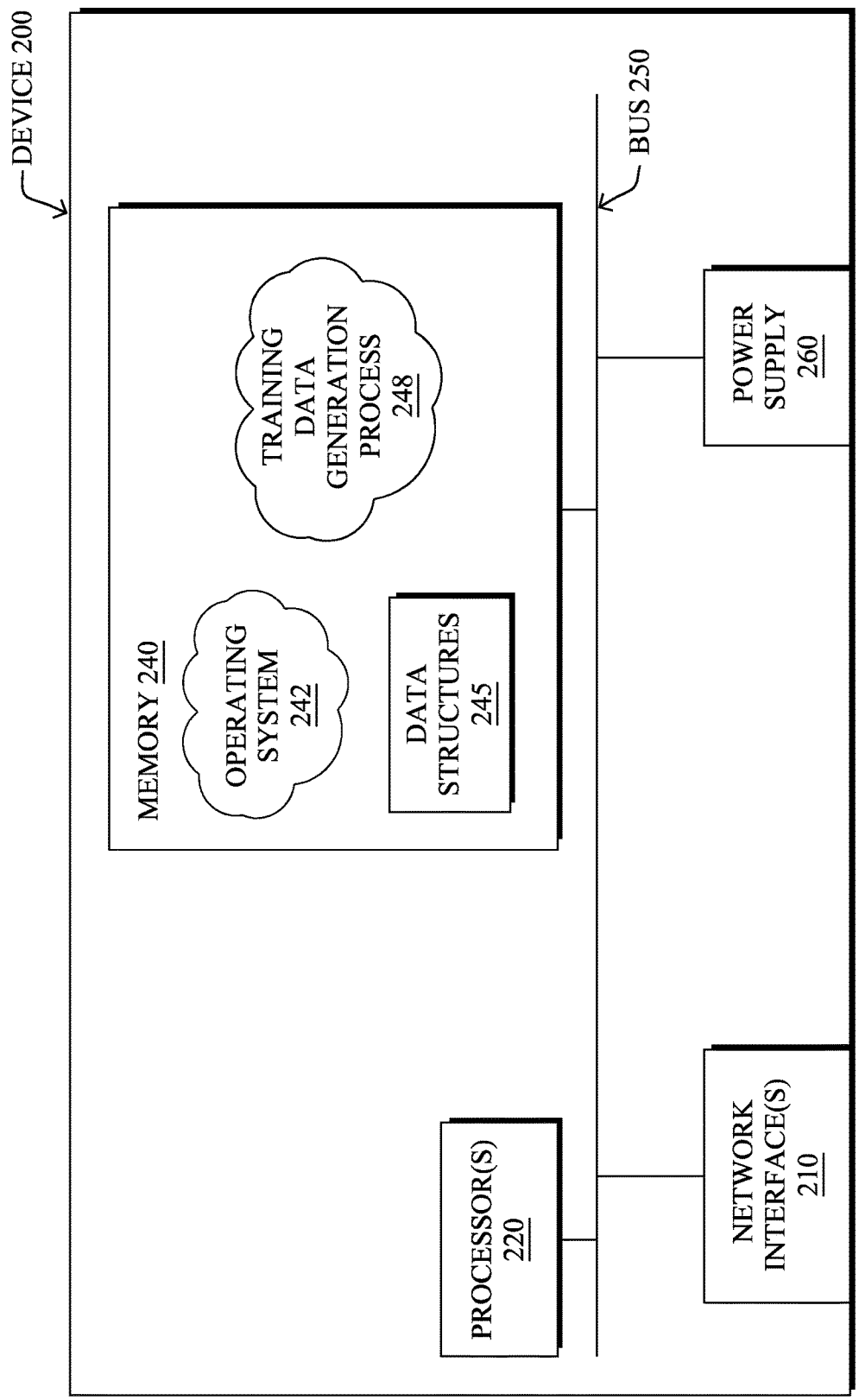
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise training data generation process 248, as described herein, any of which may alternatively be located within individual network interfaces.

Figure 3:
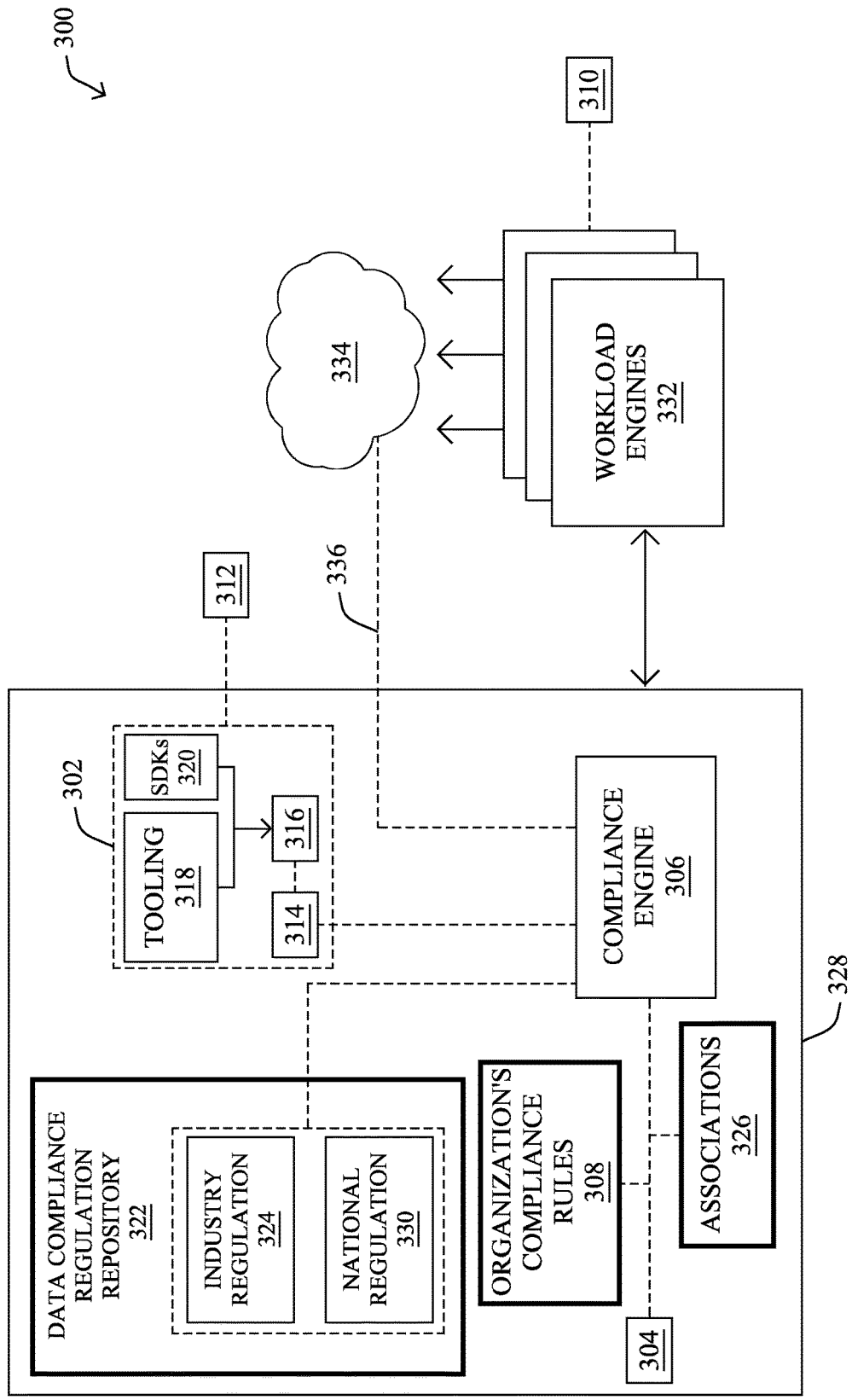
FIG. 3 illustrates an example architecture for data compliance.

FIG. 3 illustrates an example architecture 300 for data compliance, according to various embodiments. The architecture 300 may include a data compliance process 328. Data compliance process 328 may be utilized to provide configuration, observability, and enforcement of data compliance rules. Data compliance process 328 may accomplish these functions utilizing Data Compliance as Code (DCaC).

DCaC may include integrating a data compliance mechanism into the program code of the application. For example, data compliance process 328 may be utilized to build data compliance into the application development process, supported by automated code annotations, bindings between such annotations and categories of sensitive data, and controls at code, build, and pre-deploy time. Data compliance process 328 may provide a mechanism whereby application developers proactively assist data teams, application managers, and legal departments with data compliance, while ensuring that developers may remain oblivious to specific regulations, data related obligations, or compliance requirements that organizations might have across different regions.

For example, data compliance process 328 may include data annotating process 302. Data annotating process 302 may facilitate application developer 312 automatically adding metadata to program code of an application 316 during the development of the application 316. In various embodiments, this may be performed by automated annotations of data fields in the program code and by the creation of references to such annotations at code-build time. These references to annotated code may be automatically rendered in the form of machine-readable data manifest 314.

More specifically, data annotating process 302 may provide a mechanism for automated annotations of the program code of application 316, including classes, application programming interfaces (APIs), and the resulting data at code/build time (e.g., by implementing a Low-Code/No-Code approach supported by software development kits (SDKs) 320 and tooling 318). Application developers may utilize SDKs 320 and tooling 318 to automatically label data topics, data producers, data consumers, data processors, data holders, etc. For instance, developers may label certain data by annotating it with a data type identifier. For example, a developer may annotate certain data as "protected-type-1," or other data as "protected-type-2," and so on.

SDKs 320 in data annotating process 302 may provide a set of predefined data types out-of-the-box, including associations by default to specific categories of sensitive data. Sensitive data may include a type of data that may be considered personal, private, sensitive, confidential, protected, secret, restricted, personally identifiable information (PII), etc. In some examples, sensitive data may include data that is subject to regulation. For example, Table 1 lists examples of predefined protected data types and default associations to some examples of categories of sensitive data.

TABLE 1

| PROTECTED DATA TYPE | DEFAULT ASSOCIATION |
| --- | --- |
| protected-type-1 | Customer PII |
| protected-type-2 | Employee PII |
| . . . | . . . |
| protected-type-23 | Patient Analysis Results |
| . . . | . . . |
| protected-type-41 | Sales Confidential |
| . . . | . . . |
| protected-type-56 | Restricted HR |
| . . . | . . . |
| unprotected | NA |

A list of the associations, such as the example illustrated in Table 1, may provide associations by default to several categories of sensitive data, including but not limited to PII, confidential, restricted, and unprotected data. In some embodiments, the set of predefined protected data types might be standardized or rely on an existing taxonomy.

SDKs 320 in data annotating process 302 may also provide a mechanism to define and use custom data types in annotating program data of the application 316. For example, custom data types may be utilized, which identify protected data types that are not covered by any of those available by default in SDKs 320. For example, "custom-type-1" might be a custom data type associated to a category of sensitive data such as "Restricted Employee Poll." In various embodiments, the generation and/or insertion of the annotations into the program code of the application 316 may be accomplished by an automated process (e.g., a programmatic identification of data of a particular data type triggering an automated insertion of an annotation of the data as the particular data type, etc.), a partially automated process (e.g., a programmatic flagging of data of a particular data type with a supervised or manual annotation of the data as the particular data type, etc.), and/or a manual process (e.g., a manual flagging of data of a particular data type and/or a manual annotation of the data as the particular data type, etc.).

In various embodiments, associations between protected data types and categories of sensitive data may be assigned and/or instrumented by different organizations and at different moments in time. In some cases, the association between protected data types and categories of sensitive data may be assigned by application developers 312 at code/build time. This might be the case when the team of application developers 312 is part of, or develops for, the organization that may use or manage the application 316. In such cases, the team of application developers 312 might have sufficient knowledge about the data and their use, so that they may either use the associations provided by default or create custom ones.

In additional instances, application developers 312 of application 316 and/or the users of the application 316 might belong to different organizations. For example, this may be the case when application developers 312 are a DevSecOps team that develops an application 316 that may be used across different organizations, industries, etc. In such cases, application developers 312 may be unaware of the categories of data that should be assigned by a data team and/or application manager 304 in another organization (e.g., precisely what data is confidential and what data is not with respect to that organization and its use of the application

316). In these instances, application developers 312 may leverage SDKs 320 and tooling 318 to approach data labeling and association in a manner that sidesteps the knowledge deficit while still instilling the functionality. For example, the application developers 312 may leverage SDKs 320 and tooling 318 to automatically add the different classes of protected data type at code and build time (e.g., utilizing predefined and custom protected data types). Additionally, or alternatively, the application developers 312 may leverage SDKs 320 and tooling 318 to automatically insert references in the form of machine-readable descriptions for the protected data types that may be used to generate data manifest 314 bound to application 316 at build time.

The protected data type annotations and their corresponding references may be utilized by a data team and/or application manager 304 in another organization to select and/or create automated associations 326 between categories of annotated data in the application 316 (e.g., metadata provided by application developers 312) and specific categories of sensitive data (e.g., personal data, private data, sensitive data, confidential data, protected data, secret data, restricted data, PII, etc.). For instance, each protected data type might be bonded to a class of tokens (e.g., JSON Web Tokens with a specific scope), which in turn might represent different categories of sensitive data for a data team and/or application manager 304.

In a specific example, an API call for application 316 may be labeled by application developers 312 with a data type identifier such as "custom-type-7" at code/build time. The "custom-type-7" labeled API call may attempt to access certain data using its bound token (e.g., "Token 7") with a scope defined by, for example, a data team and/or application manager 304 before application 316 was deployed. From the data team and/or application manager 304 perspective, the attempt to access this data may translate to a request to access, for instance, "Confidential Partner" data. As such, the data type labels, and their associations may be utilized as an automated data mapping between the programmatic operations of application 316 and the sensitive data implicated in those operations. In various embodiments, these associations and functionalities may be supported by compliance engine 306 based on the selection, configuration, and automation of data compliance rules before application 316 is deployed and/or post-deployment.

In some examples, application developers 312, which again may be a DevSecOps team, might opt for a hybrid approach to generating these associations. For example, this may be the case when making some custom associations between data types and categories of sensitive data or using those predefined in the system (e.g., "protected-type-1" to "Customer PII") might not only be trivial for the application developers 312 but also may facilitate the task of a data team and/or application manager 304 in defining associations. However, other associations might not be apparent to application developers 312. Hence, certain data in application 316 may be labeled as "protected types" along with their corresponding machine-readable descriptions in data manifest 314, though they may remain unassigned to a specific category of sensitive data, so they can be associated later by a data team and/or application manager 304 before the application is deployed, or by an automated data lineage, classification, and tagging process at run time (e.g., during the testing phase, that is, before the application is deployed in production).

In some embodiments, a data team and/or application manager 304 may be provided with a mechanism to change the associations created by application developers 312 or even associate more than one category of sensitive data to a given data type (e.g., a data team and/or application manager 304 may associate certain data with both "Employee PII" and "Confidential Data"). Hence, two categories of data compliance policies (e.g., one for "Employee PII" and another for "Confidential Data") may apply and restrict even further the access to this category of data. In general, a data team and/or application manager 304 may be able to Create, Read, Update, or Delete (CRUD) any association between the metadata provided by application developers 312 and categories of sensitive data.

In various embodiments, a data team and/or application manager 304 may proactively create a set of custom data types. A data team and/or application manager 304 may provide the set of custom data types to application developers 312. Application developers 312 may then utilize the set of custom data types so that application 316 is annotated at development based on guidelines (e.g., the set of custom data types, etc.) provided beforehand by the data team and/or application manager 304.

In additional embodiments, application developers 312 and a data team and/or application manager 304 may collaborate to annotate application 316. For example, application developers 312 and a data team and/or application manager 304 may iterate in the annotation and association processing in an agile manner. For example, the iteration may be performed as part of a continuous integration/continuous delivery (CI/CD) pipeline (e.g., at testing, staging, and production).

In some examples, application 316 may be composed of several services developed with different programming languages. Therefore, application 316 may utilize different SDKs 320. In some instances, the annotation methods and terminology applied to application 316 may vary depending on the programming language (e.g., usually referred to as attributes in C#, decorators in Python, annotations in Golang, etc.). In such cases, tooling 318 of data annotating process 302 may examine the different predefined and custom data types used with different SDKs 320, perform checks, and ensure consistency in the annotations and enumeration across the different services at build time. For example, these consistency checks may ensure that a given "custom-type-X" data type identifier represents the same type of data across services programmed using different programming languages even if they were programmed by different developers. Overall, the data annotating process 302 may provide different degrees of freedom to application developers 312, data teams and/or application managers 304, and the number of protected data types used, and their corresponding associations may vary depending on the type of application 316.

Data annotating process 302 may, as described above, be utilized in generating automated data references. Specifically, data annotating process 302 may automatically render a data manifest 314 bonded to application 316 at build time. Data manifest 314 may provide machine-readable descriptions of the predefined and/or custom data types used by application 316. A combination of SDKs 320 and tooling 318 may facilitate the instrumentation and automation of the program code at build time, including the automated rendering of data manifest 314. In some cases, application 316 may be composed of various containers. Each container may be built and packaged with its own data manifest, such that the final data manifest rendered for application 316 may be a composition of the individual data manifests. In some cases, application 316 may include dependencies on external services, such as a MySQL database. Such dependencies may be captured as a dependency manifest. Data fed, processed, retained, or retrieved from these external services may also be annotated and automatically captured in application 316 data manifest 314.

Data annotating process 302 may, as described above, be utilized for decoupling data compliance from the business logic of application 316. For example, SDKs 320 and tooling 318 of data annotating process 302 may provide automated mechanisms for decoupling the configuration, observability, and enforcement of data compliance rules from the business logic of application 316. In some instances, application 316 may be a cloud/edge native application, which may be implemented as a set of workloads composing a service mesh. The decoupling of data compliance from the business logic may be especially relevant for applications of this type, as geographically dispersed and/or variably deployed workloads may implicate increased data compliance complexity.

Various possible embodiments for decoupling data compliance from the business logic of application 316 may be utilized. For instance, a sidecar model, where the services that implement the business logic of application 316 are deployed together with sidecar proxies associated to each of those services, may be utilized. The sidecar proxies may be utilized to enforce horizontal functions that are independent of the business logic, such as routing, security, load balancing, telemetry, retries, etc. As such, the sidecars may be well-positioned to decouple, observe, and control data compliance. For example, a combination of distributed data compliance controllers and sidecar proxies may be used to configure, observe, and enforce data compliance rules across different geographies, and distributed multi-cloud and edge infrastructures 334.

Instead of, or in addition to, using sidecars, various embodiments may use client libraries, daemons working in tandem with the application-specific services, or sandboxed programs in the OS kernel, e.g., using the Extended Berkeley Packet Filter (eBPF). Further embodiments may use an agentless approach or embed such functionality in a container orchestration system, such as Kubernetes itself. In any case, the functionality introduced herein may enable the portability and reuse of observability and enforcement of data compliance functions across not only different applications but also cloud and edge environments.

The above-described data annotating process 302 may yield a portable annotated application 316 that is geared with built-in annotations for different types of protected data. In addition, the yielded annotated application 316 may be structured to operate while remaining agnostic of any state, country, industry, organization-specific regulation and/or data policy requirements that a data team and/or application manager 304 might have. As a result, data annotating process 302 may be leveraged as a new model of building applications including DCaC by not only data teams and/or application managers 304, but also software as a service (SaaS) providers and others.

Data compliance process 328 may provide configuration, observability, and enforcement of data compliance rules. As described above, associations 326 between categories of annotated data in application 316 and specific categories of sensitive data may be instrumented prior to a deployment of application 316. The associations 326 may be used to control the processing and use of data during and after the deployment of application 316. More specifically, compliance engine 306 may utilize associations 326 together with current data compliance regulations governing data handling in each region where application 316 may be used, as well as a specific organization's compliance rules 308 for/while using application 316, to enforce compliance with them. Such controls may apply to data access requests, data storage and retention policies, data processing requirements, etc. of application 316 both at deploy and execution time, etc.

To this end, data compliance process 328 may include data compliance regulation repository 322. Data compliance regulation repository 322 may provide a repository of data compliance rules. For example, data compliance regulation repository 322 may include a repository of industry regulations 324 which may be applicable to the use of application 316. For example, with respect to instances where application 316 is used by a healthcare provider, data compliance regulation repository 322 may include industry regulations 324 such as Health Insurance Portability and Accountability Act of 1996 (HIPAA) regulations applicable to handling of data in the healthcare industry. In other examples, data compliance regulation repository 322 may include a repository of national regulations 330 which may be applicable to the use of application 316. For example, with respect to instances where application 316 is based in a member state of the E.U., data compliance regulation repository 322 may include national regulations 330 such as the GDPR applicable to handling of data in the E.U.

The data compliance regulations included in data compliance regulation repository 322 may be consumed by a data team and/or application manager 304 as a service (aaS). Data compliance regulation repository 322 may support input, expression, collection, approval, visualization, and/or use of data compliance policies covering multiple categories of rules. For example, data compliance regulation repository 322 may store data compliance policies that are specific to an industry, those that may apply at a national, multi-national, federal, state, and industry levels, etc. For instance, an organization (e.g., a multi-national company) may leverage a data compliance regulation repository 322 service of a data compliance process 328 and utilize the regulations already available in data compliance regulation repository 322, which may cover regulations across several industries and countries out-of-the-box. An organization may select the target state, country or region, the industry if needed, and select the data compliance regulations that may be applicable at the organizational level (e.g., organization's compliance rules 308).

Compliance engine 306 may offer APIs and a user-friendly user interface (UI) through which a data team and/or application manager 304 may select and define data compliance requirements. For instance, if application 316, which handles Customer PII data, needs to be deployed in British Columbia, Canada, a data team and/or application manager 304 may simply select "Customer PII→Apply Local Regulation" to constrain the processing, storage, retention, and access to Customer PII data according to the regulations in British Columbia as retrieved from data compliance regulation repository 322. To this end, compliance engine 306 may compute and handle the resulting constraints that apply to Customer PII data in British Columbia transparently to data teams and/or application managers 304. More specifically, the set of data compliance constraints may be captured in a machine-readable format from data compliance regulation repository 322, and therefore, used by compliance engine 306 programmatically.

In some examples, compliance engine 306 may be utilized as a pluggable module working in tandem with one or more workload engines 332, such as Cisco Intersight or any automation tool offered by a hyperscaler, or other cloud and edge providers. Workload engines 332 may manage the deployment of application 316, subject to the rules and constraints provided by compliance engine 306.

In various embodiments, compliance engine 306 may operate either in a push or a pull model. For instance, in a pull model, a workload engine 332 may receive a request to deploy application 316 in a given region (e.g., a request from a site reliability engineering (SRE) and/or information technology (IT) team 310). In such a case, workload engine 332 may issue a request to compliance engine 306, to compute and return data compliance rules and constraints that must be applied for their specific deployment. Alternatively, in a push model, a data team and/or application manager 304 may select the compliance rules required and a declarative intent for application deployment may be issued from compliance engine 306 to one or more workload engines 332. Such deployments may involve multi-cluster service meshes, which may run across nodes hosted in various infrastructures, including multi-cloud and edge infrastructures 334.

In various embodiments, the nodes hosted in the various infrastructures (e.g., edge infrastructures 334) may also operate as data collection nodes. For example, an application may be executed at and/or in association with the node and application data associated with that execution may be collected at the data collection node. The collection, sampling, modification, and use of third-party application data for model training purposes may be supported by one or more dataset generator processes at and/or associated with the data collection node.

Figure 4A:
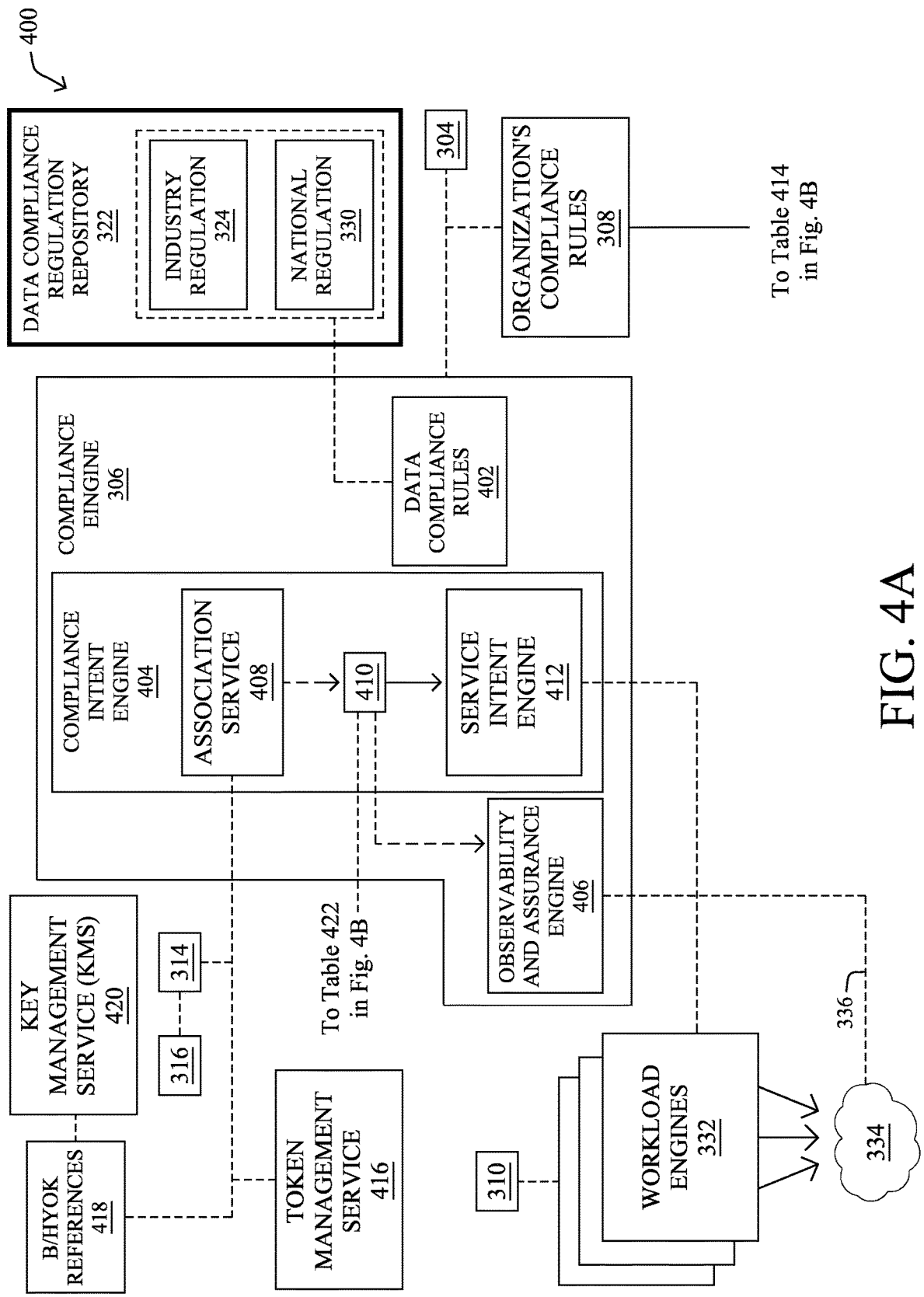
FIGS. 4A-4B illustrates an example architecture for data compliance and protection bindings.
Figure 4B:
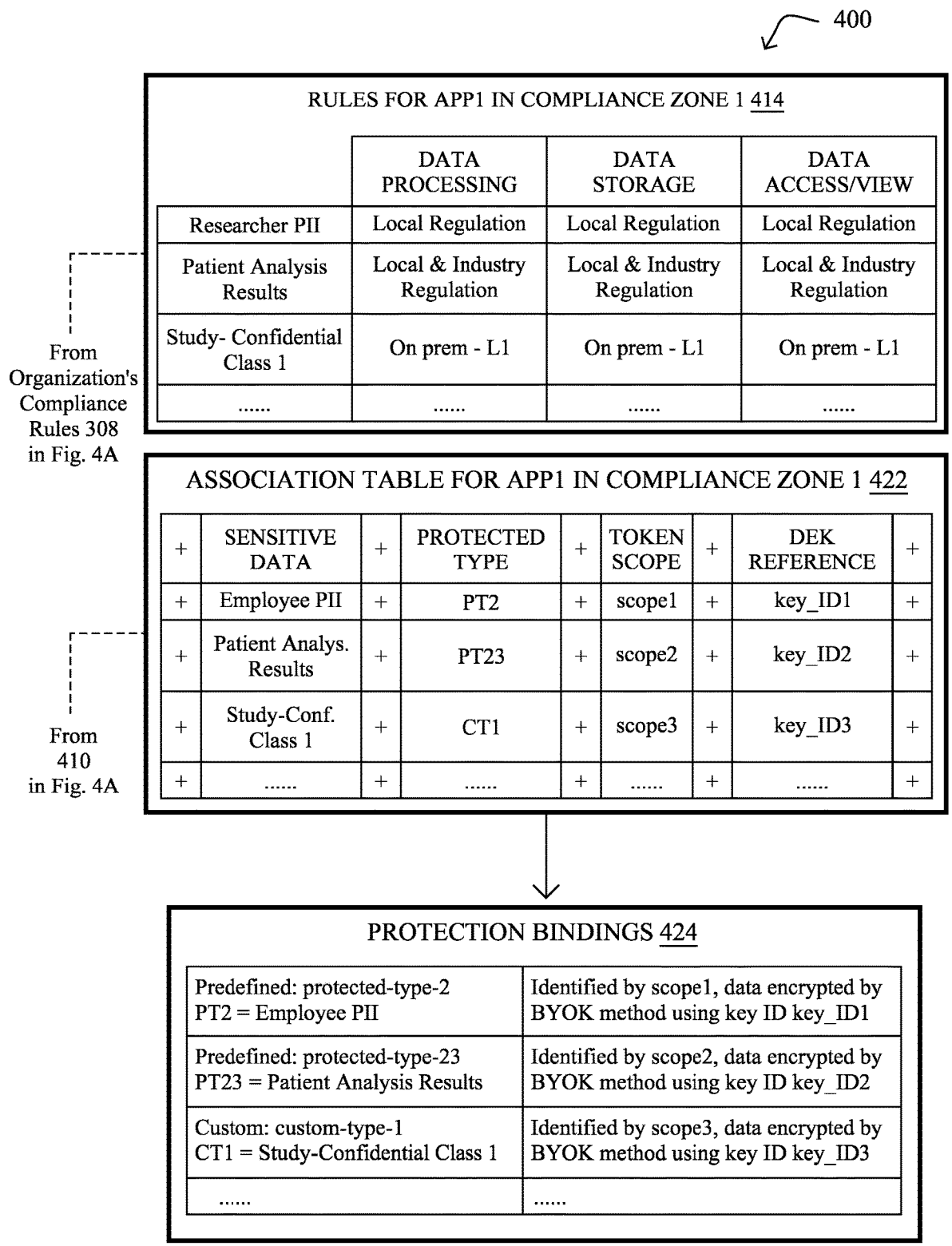

FIGS. 4A-4B illustrate an example architecture 400 for data compliance and protection bindings according to various embodiments. Architecture 400 may be utilized to deliver DCaC. For example, architecture 400 may include compliance engine 306. Compliance engine 306 may include data compliance rules module 402, compliance intent engine 404, and/or observability and assurance engine 406.

Data compliance rules module 402 may compute compliance constraints based on a combination of inputs. For example, the constraints may be computed based on a combination of inputs including the target state, country, or multi-country region for an application, the industry the application is being utilized within, and/or the compliance rules required by an organization using the application.

Compliance intent engine 404 may include an association service 408. Association service 408 may manage a set of association tables 410. Association service 408 may include functionality to allow a data team and/or application manager 304 to select, configure, and create the associations (e.g., associations 326 from FIG. 3) and store them in the form of protection bindings 424 in association tables 410 (e.g., populated association table 422 and its associated protection bindings 424 provide a non-limiting specific example of one such association table). The protection bindings 424 may define a data handling scope bonded to the association between a data type and its associated category of sensitive data. The data handling scope may be an indication of how data will be handled by the application (e.g., applicable tokens, token scopes, encryption keys, etc.). The protection bindings 424, stored in populated association table 422 may be created and/or maintained by compliance engine 306. The protection bindings 424 may not be reinserted into the program code but rather maintained by compliance engine 306 since protection bindings 424 may be subject to changes over time (e.g., the scopes might change, encryption keys may be rotated, etc.) and keeping the protection bindings 424 outside of the program code may prevent these changes from affecting the program code.

Additionally, compliance intent engine 404 may include a service intent engine 412. Service intent engine 412 may interface with workload engines 332. Service intent engine 412 may either receive and/or process data compliance requests from workload engines 332 (e.g., pull model) or create and/or issue declarative intents encoding a deployment request to workload engines 332 (e.g., push model).

Observability and assurance engine 406 may receive telemetry data from services deployed in the field (e.g., from a service mesh deployed across multi-cloud and edge infrastructures 334). In addition, observability and assurance engine 406 may push data compliance configurations and data traffic filters in real-time 336 out to workloads deployed in the multi-cloud and edge infrastructures 334.

To populate association tables 410 and create protection bindings 424, association service 408 may obtain inputs defining the associations of the protected data types and/or their data handling scopes. For example, for each annotated application 316, association service 408 may obtain data manifests 314 describing the set of predefined and custom protected data types handled by annotated applications 316 and potential associations already made by application developers (e.g., application developer 312 in FIG. 3).

Additionally, association service 408 may obtain data handling scopes to be bonded to individual associations between given data types and their associated category of sensitive data. For example, association service 408 may obtain, as an input, categories of tokens and corresponding scopes that may be associated with each of the protected data types used in the annotated classes and methods that compose the annotated application 316. Such tokens may be defined and/or obtained from external token management service 416 (e.g., from OKTA).

Further, association service 408 may obtain, as an input, identifiers of encryption keys. The encryption keys may be those keys associated with each of the protected data types used in the annotated classes and methods that compose annotated applications 316. For example, different categories of sensitive data may be encrypted utilizing techniques such as bring your own key (BYOK) or hold your own key (HYOK). The encryption key identifiers (ID) may be defined or obtained from external encryption key service 418, which may extract encryption key IDs. External encryption key service 418 may interface with key management service (KMS) 420 and may create references (e.g., key IDs) to encryption keys stored and managed by KMS 420. In this manner, the keys may not be managed by association service 408, but instead may remain secure with KMS 420.

This set of inputs may be utilized by association service 408 to populate association tables 410. In some examples, there may be one association table populated per annotated application 316 and/or per data compliance zone (e.g., a geographical area where the application is deployed, etc.). A populated association table 422 may include the automatically associated annotated data types (e.g., protected data type labels), with categories of sensitive data (e.g., encoded in the form of tokens with specific scopes as illustrated in populated association table 422), along with pointers to the encryption keys used for each category of protected data (e.g., key IDs).

Compliance engine 306 may handle one populated association table 422 per compliance zone for each annotated application 316. In some embodiments, populated association table 422 may be extended to include columns denoting API paths to access the data resources. In some cases, the paths may explicitly embed the protected data types used by the application developers. In addition, the tokens, scopes, and key IDs may be renewed and dynamically updated in populated association table 422 depending on their validity and/or expiration time. Populated association table 422 may also manage more advanced associations, including men bindings (e.g., two or more protected data types might be associated to a single token/scope class).

Once association tables 410 are defined and/or populated, a data team and/or application manager 304 may select the organization's compliance rules 308. Organization's compliance rules 308 may include data compliance rules (e.g., data compliance rules 414) selected to be required for a specific annotated application 316 (e.g., "App 1") that should be deployed in a specific geographical region (e.g., "Compliance Zone 1").

For example, data compliance rules 414 may include constraints selected to be applied to each category of sensitive data (e.g., "Researcher PII," "Patient Analysis Results," "Study-Confidential Class 1." etc.) within annotated application 316 "App 1". Data compliance rules 414 may further specify the selected constraints associated with processing the category of sensitive data, storage, and retention of the category of sensitive data, and/or accessing or viewing the category of sensitive data by the annotated application 316.

Data compliance rules 414 may be rules that may apply to a new annotated application 316 (e.g., "App 1"). In this example, application "App 1" may handle data about clinical trials of a new drug developed by a pharmaceutical company. Application "App 1" may collect and analyze data and provide insights about the new drug. In this example, the application "App 1" may support several categories of sensitive data.

For example, the application "App 1" may support the category of sensitive data "Researcher PII" data, which may include PII of the employee conducting one of the trials. In this example, the rule chosen may be one to restrict the processing, storage, retention, and access to the data according to a "local regulation." For example, if the compliance zone where the application is going to be deployed is British Columbia, Canada, then this rule automatically constrains the location of workloads, the storage, and any attempt to access or view such data according to the regulation on PII in British Columbia, Canada. If the trials were instead to be conducted in New Delhi, India, the rule might be the same (e.g., applying a local regulation), but the resulting constraints yielded by compliance engine 306 will usually differ from those in British Columbia, Canada by virtue of the two locations having different data handling regulations.

Application "App 1" may also support the category of sensitive data "Patient Analysis Results" data. In this example, the rule chosen by a data team and/or application manager 304 may adhere to both the local and industry-specific regulation. In the examples of application "App 1." the industry-specific regulation may include, for example, specific legislation constraining the processing, storage, retention, and access to patients' data with respect to clinical trials.

Application "App 1" may additionally support the category of sensitive data "Study-Confidential Class 1" data. This data type may be a custom protected data type that may be implemented to enable researchers to keep a specific category of data related to the clinical trials as highly confidential. In this example, the processing, retention, and access to the data may be constrained to a specific facility. For example, perhaps the processing, storage, retention, and access of the "Study-Confidential Class 1" data is constrained to the premises of a "Laboratory 1" associated with the clinical trial (e.g., "On prem-L1").

Based on data compliance rules 414 input along with the corresponding protection bindings 424, data compliance rules module 402 may identify the implicated categories of sensitive data. For example, the three categories of sensitive data (e.g., "Employee PII," "Patient Analysis Results," and "Study-Confidential Class 1") listed in data compliance rules 414, along with corresponding protection bindings 424 in populated association table 422 may be identified by data compliance rules module 402. These categories of sensitive data may be defined and/or used by a data team and/or application manager 304 and/or may have already been associated to specific predefined and custom protected data types, such as the ones shown in populated association table 422 and/or protection binding 424.

In addition, data compliance rules module 402 may identify the selected compliance requirements listed in data compliance rules 414. For example, data compliance rules module 402 may identify the compliance requirements specified for processing, storage, retention, and access for each of the categories of sensitive data as defined in data compliance rules 414.

Data compliance rules module 402 may compute the set of compliance constraints that apply to application "App 1" based on data compliance rules 414 and/or a compliance zone selected (e.g., a target country and industry for "App 1"). In some examples, the set of compliance constraints may be computed from, for example, industry regulations 324, national regulations 330, etc. obtained from data compliance regulation repository 322.

The output of data compliance rules module 402 (e.g., the computed set of compliance constraints for a category of sensitive data) may be processed by compliance intent engine 404. Compliance intent engine 404 may link the resulting constraints to the corresponding populated association table 422 and send this output to both observability and assurance engine 406 and service intent engine 412. As such, the compliance constraints may be linked to categories of sensitive data and/or their associated protected data types in the program code. Therefore, the compliance constraints may be linked to individual portions of the application code. For instance, the constraints may be linked to control a data transfer through an API call that was previously annotated by application developers 312 using the protected data types referenced in protection bindings 424, populated in association table 422, and constrained by data compliance rule module 402 according to data compliance rules 414.

In various embodiments, once a service mesh is deployed, a data consumer process may request access to a data resource through an API. This may be implemented using a GET method including a path containing the field "custom-type-1" (CT1), which, according to populated association table 422, represents the custom protected type "Study-Confidential Class 1." The HTTP request may be transported and forwarded over mTLS across the sidecar proxies in the service mesh. The authorization header in the service mesh may carry "token 3" with a specific scope "scope 3," as defined in populated association table 422. In this example, "scope 3" represents the category of sensitive data "Study-Confidential Class 1," and the constraint in this case is that the data of that type must be retained on "prem Lab1." To that end, service intent engine 412 may have requested and/or instructed a workload engine 332 to deploy the workloads handling "CT1" "on prem L1." In turn, observability and assurance engine 406 may have configured data filters in the sidecar proxies to enforce access control. For instance, API calls using an authorization token with "scope 3" may be restricted to data consumers located "on prem L1."

Compliance engine 306 may process more elaborate data compliance rules than simply those illustrated, including the selection of specific locations for processing, storage, retention, and access for each category of sensitive data. For instance, a data team and/or application manager 304 may choose a specific data center (e.g., where their data warehouse is hosted), a compliant public or edge zone, a compliant private cloud or edge site, combinations of these, etc. While some of these selections may be very specific, others might remain openly declarative, which a member of SRE/IT team 310 may translate into a specific infrastructure request for deploying the application, or some of the services that comprise the application.

Some of the tokenization mechanisms described herein may be externally handled, such as by an authorization server, which may potentially work in concert with a delegated authorization solution (e.g., OAuth 2.0/OpenID Connect), a single sign-on (SSO) solution, etc. In such scenarios, the specific categories of tokens and scopes references in association tables 410 may be obtained from external systems.

In addition to the tokenization mechanisms, a data team and/or application manager 304 may also select the user and/or process groups that may have access to the different categories of sensitive data (e.g., read only, read and write, or no access). Such groups may be managed using internal tools or they may be externally handled by an authorization service (e.g., OKTA). In some embodiments, the selection of token scopes and the access rights applied to user and/or process groups may be made jointly. These additional constraints may also be part of the data compliance rules and state maintained by data compliance rule module 402.

In an alternative embodiment, compliance engine 306 may also enable the use of third-party annotations and/or data catalogs (e.g., imported from external data classification and tagging systems, such as from Collibra, OneTrust, or others). In such cases, the protected types used in protection bindings 424, and populated in association table 422, may be comprised of a set of annotation labels (i.e., metadata) added by application developers 312 (e.g., PT2, PT23 and CT1 in FIGS. 4A-4B) as well as third-party labels provided by external systems.

As such, DCaC implemented through architecture 400 may provide two levels of decoupling. First, a decoupling between the annotations or metadata embedded in the program code of the application as provided by application developers 312 at code/build time and the categories of sensitive data that may be selected and associated by a data team and/or application manager 304 before the annotated application 316 is deployed. Second, a decoupling between the categories of sensitive data and the rules selected by a data team and/or application manager 304, and the specific data compliance regulation and data compliance constraints that may apply to a given industry and/or region.

Such an approach may facilitate application developers 312 proactively assisting a data team and/or application manager 304, while all of them are allowed to remain oblivious to the specificities and intricacies of the different data compliance regulations across the different industries and regions.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, the number of laws, regulations, and rules regarding the storage and use of certain types of data are continually increasing across the globe. For instance, the General Data Protection Regulation (GDPR) in Europe places strict regulations on how a user's personal data is collected and shared. These and other regulations have spawned independent efforts across several countries to ensure that online applications comply with specific data regulations at national, federal, or state level, and particularly, those that are cloud-based. This acceleration in data sovereignty regulations is posing complex challenges to the organizations that use or manage that data, since legal obligations and constraints vary from country to country. The challenge is even greater since data compliance requirements are often not limited to data sovereignty obligations. For example, depending on the type of an application, data compliance may demand the amalgamation of other regulations, such as industry-specific regulation (e.g., complying with HIPAA obligations in the healthcare industry in the United States), or organization-specific rules (e.g., on how to deal with confidential data). Regardless, of the source of the data compliance requirement, it's observance may involve the handling of data in a particular way at runtime.

For most organizations, the collection, use, and analysis of data is crucial. Hence, one of the areas where these challenges are evident is data analysis and the use of production data for model training. Previous approaches have developed numerous data analysis techniques, many of which require datasets to train their models, learn, and improve the inference algorithms (e.g., using supervised, semi-supervised or unsupervised learning techniques). Indeed, many organizations already have valuable datasets in production, which they are willing to use for model training purposes.

Commonly, the data used for training the model are collected and, in many cases, sampled, which are then sent to the cloud for centralized learning (e.g., using centralized models running in the cloud). In this scenario, the raw data is sent to the cloud for training purposes, thereby leveraging the compute power and scalability offered by cloud infrastructures. However, basic data compliance aspects remain a challenge. For instance: Is model training compliant with the primary purpose of data collection and utilization according to regulatory obligations? Is the data transfer to the cloud and subsequent processing compliant with data regulations? Is it compliant with the organization's rules?

Some approaches rely on a federated learning configuration. In this configuration, the data used for the training may stay where it is collected and possibly sampled, which may then be used by federated learning agents to train local models (e.g., at the edge). These local models may be combined into a global model, which may also leverage the benefits offered by cloud infrastructures. However, this configuration has two main problems; it is subject to bias and accuracy challenges (including dataset balancing issues), and, as in the case of the centralized configuration, it suffers from potential compliancy issues associated to the purpose and use of the data (e.g., secondary purpose issues).

Therefore, data compliance is presently a missing piece in the field of model training. Indeed, data compliance has been an "afterthought", as data compliance is only being considered once the datasets need to be transferred and/or used for model training. For example, existing data compliance strategies lack integration in the application program code itself (e.g., they do not utilize a DCaC model) and instead rely on dynamically trying to determine what type of data is being shared and/or used.

As such, existing strategies for generating datasets to train models, learn, and improve inference algorithms provide insufficient data visibility and/or control at collection nodes to navigate the modern minefield of data compliance regulations. Accordingly, these strategies are increasingly yielding data compliance violations resulting in substantial fines, penalties, and/or other negative impacts to data handlers.

Constraint-Based Training Data Generation

The techniques herein introduce mechanisms for the collection and sampling of production (i.e., real) data handled by a DCaC-enabled application and automate the generation of compliant datasets that can be transferred to the cloud for centralized training and learning (or to other locations). This capability may be based on observing and sampling production data and their associated metadata identifiers (e.g., tags created and associated to different types of sensitive data as part of the DCaC process), along with a compliance-led dataset generation technique, which may selectively combine synthetic, anonymized, and original data.

Illustratively, the techniques described herein may be performed by hardware, software, and/or firmware, such as in accordance with training data generation process 248, which may include computer executable instructions executed by the processor 220 (or independent processor of interfaces 210) to cause the performance of functions relating to the techniques described herein.

Specifically, according to various embodiments, a device may receive a request for training data that is based on application data generated by an application executed at a data collection node, wherein the application data is associated with metadata identifiers. The device may determine one or more training data constraints that restrict use of the application data as training data. The device may generate the training data in part by excluding application data of a particular type from being included in the training data based on a match between its metadata identifier and the one or more training data constraints. The device may provide the training data to be used to train a machine learning model.

Figure 5:
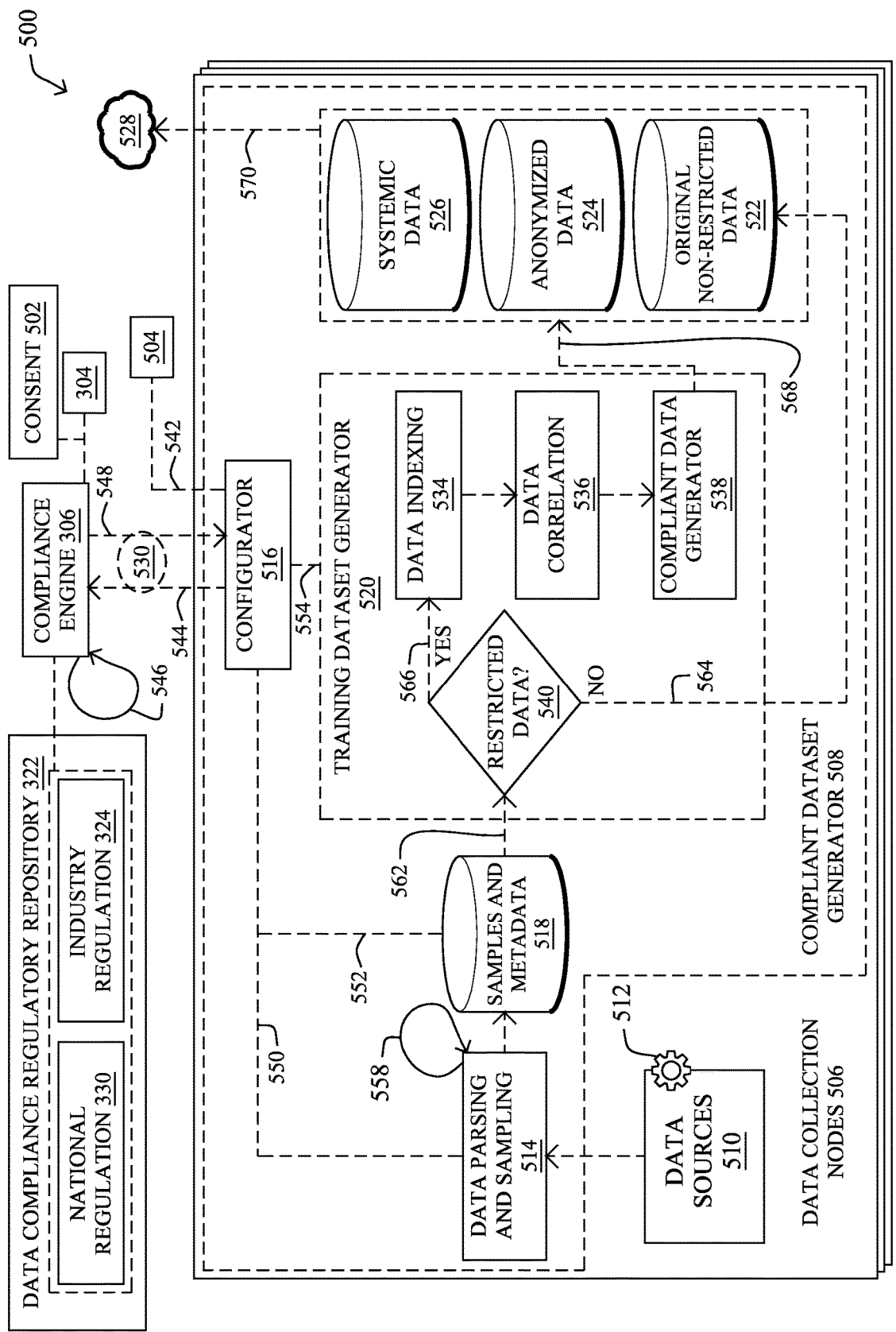
FIG. 5 illustrates an example architecture for constraint-based training data generation.

Operationally, FIG. 5 illustrates an example architecture 500 for constraint-based training data generation, according to various embodiments. As previously mentioned, a workload engine may manage deployment of an application 512, subject to the rules and constraints provided by compliance engine 306. Again, such deployments may involve multi-cluster service meshes, which may run across nodes hosted in various infrastructures, including edge infrastructures (e.g., edge infrastructures 334 of FIG. 3).

Therefore, the nodes where the application 512 is executing may operate as data collection nodes 506 where application data associated with application 512 is collected from one or more data sources 510. As detailed below, the data collection nodes 506 may also run another application, such as a compliant dataset generator 508. In some embodiments, compliant dataset generator 508 may include a process executed (e.g., entirely, partially, etc.) locally to and/or by the data collection node 506. Alternatively, the process may be executed (e.g., entirely, partially, etc.) remotely from data collection node 506 such as at a different node and/or node managing device.

Compliant dataset generator 508 may support the collection, sampling, modification, and use of third-party application data for model training purposes, in a compliant way. To this end, compliant dataset generator 508 may utilize an interface 530 with compliance engine 306, in order to determine the data compliance constraints that may apply depending on the categories of data collected, the region and industry, and the compliance rules defined by an organization's compliance rules 308. Once a compliant dataset is generated, the dataset may be sent to a centralized and compliant learning framework running in a cloud 528.

For example, compliant dataset generator 508 may run in a data collection node 506 (e.g., in a computing node at the network edge). A data training team 504 may manage the configuration of compliant dataset generator 508. The data training team 504 and the application managers 304 may be affiliated or not to the same organization, and they may coordinate but operate independently.

At operation 542, a configuration/request for training data may be received by compliant dataset generator 508. The request may be received from data training team 504. The configuration/request may specify a configuration to be applied to compliant dataset generator 508 using configurator 516. The configuration may stipulate an identity of the application 512 that may provide the data to train the models. For example, the stipulated identity may be the identity of the application 512 running in the data collection node 506 that may handle data in production which may be required for centralized model training.

Application 512 and its corresponding data may have been annotated using DCaC, and therefore, the data manifest bonded to application 512 may be available to compliance engine 306 as outlined above. Application 512 and/or its corresponding data may be associated with the aforementioned DCaC metadata identifiers (e.g., tags created and associated to different types of sensitive data as part of the DCaC process). Moreover, application 512 may include several microservices, some of which may contain a set of data sources 510 that may be utilized for training purposes.

Additionally, the configuration may stipulate specific categories of data and/or data records in application 512 that should be used for the training. This input may determine the raw data that is required for the training (e.g., use only customer-related data, or focus on data related to orders, or focus on data related to a sensitive manufacturing process that is a trade secret, etc.).

Further, the configuration may stipulate data sampling requirements, if any. For example, the configuration may stipulate how data should be selected, filtered, and/or sampled from data sources 510.

Furthermore, the configuration may stipulate an industry for which the model training will be performed. For instance, the configuration may specify that the model will be trained for the healthcare, finance, manufacturing, etc. industry. Additionally, the configuration may stipulate the geographical region where the data will be trained (i.e., the region where the data will be sent, processed, stored and potential retained). For example, the configuration may stipulate the geographical region of a centralized and compliant learning framework running in the cloud 528. The configuration may also stipulate an identification of a cloud service to be used for the centralized and compliant learning framework running in the cloud 528 in the choses zone/geographical region.

Moreover, the configuration may stipulate a technique selected to generate compliant datasets before they can be sent to the centralized and compliant learning framework running in the cloud 528. For instance, the configuration may specify that synthetic data creation, data anonymization, other possible techniques should be utilized, or that none of those techniques should be utilized, etc. A different technique may be applied to each category of data depending on the characteristics of the datasets required for the training.

At operation 544, configurator 516 may utilize interface 530 to authenticate to and/or communicatively connect to compliance engine 306. Configurator 516 may utilize the configuration elements stipulated in the configuration/request that it received from data training team 504 as inputs to compliance engine 306.

At operation 546, compliance engine 306 may utilize these inputs to compute data compliance constraints to be applied to data collected at data collection node 506. For example, based on these inputs, compliance engine 306 may use the identity of application 512 to access a corresponding data manifest bonded to the application 512. Compliance engine 306 retrieve the categories of data handled by the application 512 (e.g., including indication of the metadata identifiers of each of the categories of data handled by the application 512) by this access.

Compliance engine 306 may also utilize the location of data collection node 506, and use the industry, the geographical region, the identity of centralized and compliant learning framework running in the cloud 528, the categories of data required for the training as provided as inputs from configurator 516, etc. to compute the compliance posture and the corresponding data compliance constraints that apply in each case. Indeed, compliance engine 306 may compute the data compliance constraints considering the location of data collection node 506 where the application data is collected and/or the location of the centralized and compliant learning framework running in the cloud 528.

Compliance engine 306 may determine the capacity or lack thereof of compliant dataset generator 508 to store and use data from data source 510 depending on the computed compliance constraints. Even when compliant dataset generator 508 and application 512 are managed by the same organization (e.g., by two different units or teams within the same corporation or public entity), it may be critical to ensure that the purpose for collecting and using the data is compliant with data regulations.

For instance, the primary purpose for using and storing the data from data source 510 in data collection node 506 may fall under the compliance limits of application 512. However, the collection, storage, and processing of data by compliant dataset generator 508 might deviate from the primary (and compliant) purpose of using the data, and therefore, might require additional consents and/or the application of additional data compliance constraints with respect to those that already apply to application 512. Hence, even when the management of the data, the models, and their corresponding training lie all under the same organization, the distinction between primary and secondary purposes in the usage and storage of data may be quite consequential from a compliance perspective.

To determine whether the data can be used by compliant dataset generator 508 for model training purposes, compliance engine 306 may require explicit consent 502 to use the data for a secondary purpose. Consent 502 may be sought from and/or granted by the data team or application managers 304, by a Chief Privacy Office (CPO), a Chief Compliance Office (CCO), a legal/compliance department, a user associated with the data, users who own the data or who the data is about, etc. Hence, compliance engine 306 may proceed to accept or reject the use of data from data source 510 for model training purposes.

At operation 548, compliance engine 306 may provide one or more training data constraints to compliant dataset generator 508. The training data constraints may specify the list of metadata for the types of data required for the training, their corresponding associations to categories of sensitive data as well as a restriction flag indicating whether the data are legally restricted or not. In some examples where consent 502 is sought, compliance engine 306 may provide the training data constraints subject to ACCEPT==TRUE from the aforementioned consent determination.

In various embodiments, the training data constraints may be provided to compliant dataset generator 508 as an array of tuples. The array of tuples may include the list of metadata for the types of data required for the training, their corresponding associations to categories of sensitive data as well as a restriction flag indicating whether the data are legally restricted or not as determined by the data compliance constraints computed by compliance engine 306. In some examples, the list of metadata in the tuples may include both predefined protected types (e.g., such as those specified in Table 1 and similar such types) as well as custom ones. For instance, an example array may be a list of tuples, such as: [(protected-type-1, Customer PII, RESTRICTED), (protected-type-41, Sales Confidential, UNRESTRICTED), etc.].

Once processing is accepted and/or granted, configurator 516 may proceed with configuring compliant dataset generator 508. At operation 550, configurator 516 may configure data parsing and sampling module 514. For example, configurator 516 may configure data parsing and sampling module 514 so that it is prepared to receive and handle the data coming from data sources 510. This may include configuring the data parsing and sampling by data parsing and sampling module 514 according to the data sampling requirements specified in the configuration/request received from the data training team 504.

At operation 552, configurator 516 may configure samples and metadata database 518. Samples and metadata database 518 may be configured to store the production data requested for training the model.

At operation 554, configurator 516 may configure a training dataset generator 520. Training dataset generator 520 may support core functions provided by compliant dataset generator 508. Such a configuration may include the training data constraints defined in the array provided by compliance engine 306 at operation 548. Once configured, training dataset generator 520 may resolve the categories of data (e.g., each identifiable by a metadata identifier) that it will need to process as well as their corresponding restrictions using these definitions. Once these configurations are completed, data collection from data sources 510 may begin.

At operation 556, the data collected from the various data sources 510 may be received by data parsing and sampling module 514. At operation 558, data parsing and sampling module 514 may select, filter and/or sample the data fed into compliant dataset generator 508 depending on the configuration of data parsing and sampling module 514 by configurator 516 at operation 550.

In various embodiment, compliant dataset generator 508 may expose an API to collect data from third-party applications, such as application 512. The resulting data may be persisted, at operation 560, for further processing in the samples and metadata database 518. Some of the data stored in the samples and metadata database 518 may be stored in a non-compliant form (e.g., an original form, a non-anonymized form, a non-synthetic form, a form including sensitive data prohibited from direct use in model training, etc.). The different data segments may be indexed using the corresponding metadata identifiers as a key, i.e., by the annotations or tags in the application data as defined by the DCaC process described herein.

Training dataset generator 520 may utilize the training data constraints, defined in the array provided by compliance engine 306 at operation 548 and configured to training dataset generator 520 by configurator 516, to determine which data to process and how to process that data. For example, at operation 562, each of the metadata identifiers might be used as a key to retrieve particular data segments from the samples and metadata database 518.

Training dataset generator 520 may, at operation 540, determine whether a data segment (e.g., identifiable by a particular metadata identifier) is restricted data. For example, depending on a restriction flag (e.g., "RESTRICTED" or "UNRESTRICTED") associated with a metadata identifier (e.g., as defined within a corresponding tuple) of a data segment, training dataset generator 520 may determine whether the data is classified in a restricted group, an unrestricted group, etc.

When training dataset generator 520 determines that the data segment is classified in an unrestricted group, then the data may be persisted, at operation 564, in an original (e.g., non-anonymized, non-synthetic, native, etc.) form in original non-restricted database 522. The original data may be stored in original non-restricted database 522 until it is sent to the centralized and compliant learning framework running in the cloud 528 for model training.

When training dataset generator 520 determines that the data segment is classified in a restricted group, then the data may be sent, at operation 566, to data indexing module 534 for further processing. The further processing may entail applying a variety of data processing and/or data transformation operations to generate compliant data sets from data that is not necessarily compliant for use in model training in its original format. For example, the further processing may include generating compliant data sets by selectively using synthetic data creation, data anonymization, or other techniques. Additionally, some of the data that is not compliant for use in model training in its original format may simply be excluded entirely from communication to the centralized and compliant learning framework running in the cloud 528 in any form.

Restricted data segments may be indexed by data indexing module 534. The indexed data may be correlated by data correlation module 536. The correlation may ensure, for example, the synthetic data created mirrors the original data fields and patterns in the production data. For instance, all the occurrences of a specific customer name in the production data processed, may be systematically replaced by the same synthetic name. Similarly, all the occurrences of a specific customer address in the production data processed, may be systematically replaced by the same synthetic address, and so on.

Compliant data generator 538 may then create compliant datasets for each category of data (e.g., identifiable by a corresponding metadata identifier). The compliant datasets may be created based on the configuration/request for training data received by compliant dataset generator 508 from data training team 504. More specifically, the techniques specified in the configuration/request to generate compliant datasets before they can be sent to the centralized and compliant learning framework running in the cloud 528 may be used to select techniques such as synthetic data creation, data anonymization, or other possible techniques to be applied to each category of data.

The resulting compliant datasets may be persisted at operation 568 in one or more databases. The database that the resulting compliant dataset is stored in may depend on the technique used to process the original data into the compliant dataset. For example, resulting anonymized data may be stored in an anonymized database 524 and/or resulting synthetic data may be stored in a synthetic database 526.

The compliant datasets may be sent, in 570, to the centralized and compliant learning framework running in the cloud 528 for machine learning model training. This may include sending data from original non-restricted database 522, anonymized database 524, and/or synthetic database 526 to the centralized and compliant learning framework running in the cloud 528 for model training.

As previously mentioned, the various elements illustrated in FIG. 5 may be distributed and/or run across different nodes. Also, the different levels of persistence described may be aggregated, simplified, or further segmented.

In various embodiments, the compliant dataset generator 508 may be dynamically and/or automatically updated with any updates to data compliance regulations received by compliance engine 306. For example, compliance engine 306 may send updates to configurator 516 (e.g., upon changes in data compliance regulations that may affect the constraints computed and/or the restriction flags).

In addition, compliant dataset generator 508 may support multi-tenancy. That is, different applications and/or administrative domains may use compliant dataset generator 508 concurrently.

In some embodiments, data sources 510 may include both data at rest and data in flight. Different techniques might be used to stream data to compliant dataset generator 508. For instance, data may be streamed through a message broker, through a streaming API, etc.

In various embodiments, the techniques described in relation to compliant data generator 538, synthetic database 526, and/or anonymized database 524 for generating compliant datasets may be combined and further developed into a more granular processing. For instance, different techniques might be applied to individual data records within the same data segment (e.g., name→anonymize, weight→original, address→synthetic (within the same state), etc.).

Figures 6A, 6B:
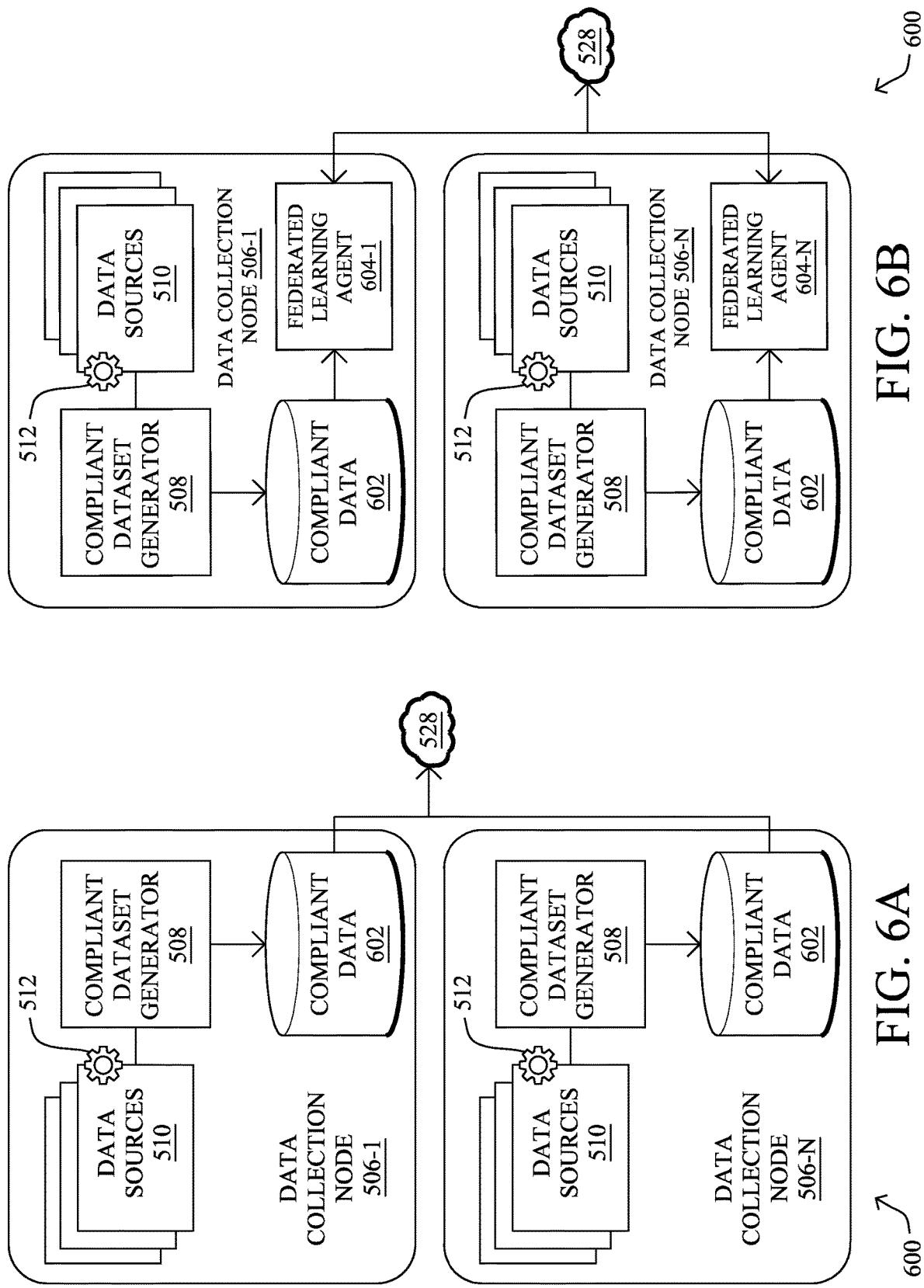
FIGS. 6A-6B illustrate examples of model training deployments for constraint-based training data generation.

FIGS. 6A-6B illustrate examples of model training deployments 600 for constraint-based training data generation according to various embodiments. The model training deployments 600 may be deployments of an architecture such as architecture 500 of FIG. 5. Model training deployment 600 may include one or more data collection nodes 506 (e.g., 506-1 ... 506-N). Each data collection node 506 may be the computing node where an application 512 is executed. Application data from this execution may be collected from data sources 510 at the data collection node 506.

As previously outlined, the application data collected from the data sources 510 may be processed into and/or persisted locally to the data collection node 506-1 as compliant data. For example, the application data may be stored at a compliant data database 602 associated with the data collection node 506.

The compliant application data may be provided as training data to be used to train a machine learning model. For example, the compliant data may be sent to a centralized and compliant learning framework running in a cloud 528. In various embodiments, such as is depicted in FIG. 6A, the raw compliant data may be sent to the cloud 528 to train the machine learning model thereby leveraging the compute power and scalability offered by cloud infrastructures. Since processing by compliant dataset generator 508 result in only the compliant raw data being sent to the cloud 528, data compliance concerns are ameliorated.

In alternative embodiments, such as is depicted in FIG. 6B, the compliant data used for the training stays where it is collected and possibly sampled, which may then be used by federated learning agents 604 (e.g., 604-1 ... 604-N) to train local models (e.g., at the edge). These local models may be combined into a global model at the cloud 528, which may also leverage the benefits offered by cloud infrastructures. Since processing by compliant dataset generator 508 result in consent being automatically sought and/or obtained potential data compliance issues associated to the purpose and use of the data (e.g., secondary purpose issues) are ameliorated.

Figure 7:
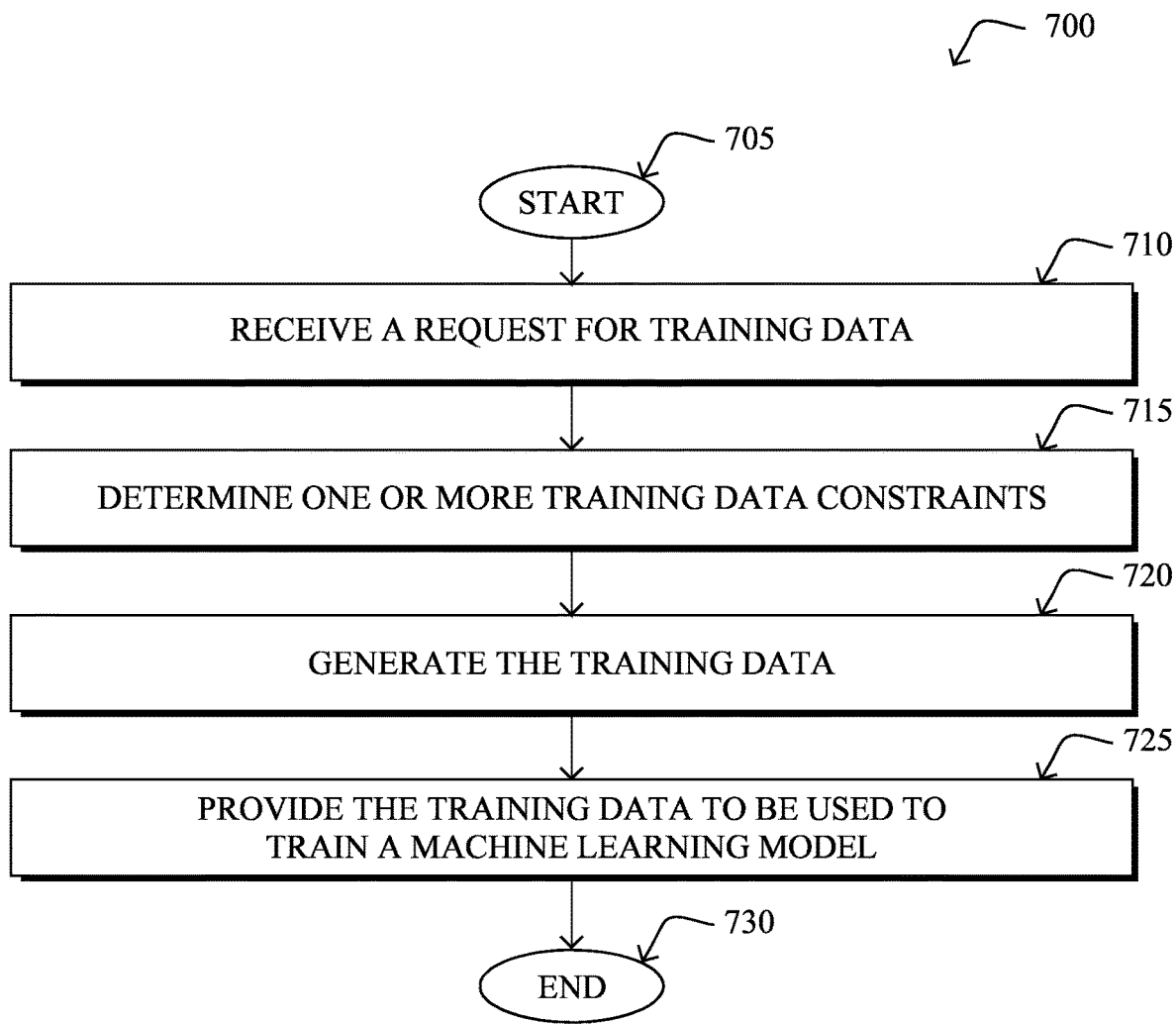
FIG. 7 illustrates an example simplified procedure for constraint-based training data generation.

FIG. 7 illustrates an example simplified procedure (e.g., a method) for constraint-based training data generation, in accordance with one or more embodiments described herein. For example, a non-generic, specifically configured device (e.g., device 200), may perform procedure 700 by executing stored instructions (e.g., training data generation process 248). In various embodiments, the device may include a data collection node. The data collection node may be a network node where the application is executed generating application data for model training.

The procedure 700 may start at step 705, and continues to step 710, where, as described in greater detail above, a device may receive a request for training data that is based on application data generated by an application executed at a data collection node, wherein the application data is associated with metadata identifiers. The request may include an identifier of the application.

At step 715, as detailed above, the device may determine one or more training data constraints that restrict use of the application data as training data. The one or more training data constraints may be based on a data manifest bonded to the application that includes a listing of the metadata identifiers. The one or more training data constraints may be based on the identifier of the application. Further, the one or more training data constraints may be based on a location of the data collection node. Furthermore, the one or more training data constraints may be based on a location of a receiver of the training data.

At step 720, device may generate the training data in part by excluding application data of a particular type from being included in the training data based on a match between its metadata identifier and the one or more training data constraints. Excluding the application data of the particular type from being included in the training data may include using the application data of the particular type to generate anonymized training data that is included in the training data. Additionally, excluding the application data of the particular type from being included in the training data may include using the application data of the particular type to generate synthetic training data that is included in the training data.

At step 725, as detailed above, provide the training data to be used to train a machine learning model. Additional steps may include obtaining, by the device, consent from one or more users for application data associated with those users to be included in the training data, and so on. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, rather than dealing with data compliance as an afterthought, leverage DCaC metadata identifiers to automatically generate compliant application data sets for model training. The techniques described herein may be built into the application development lifecycle as well as in the data collection and sampling process. More specifically, this invention enables the collection and sampling of production (i.e., real) data handled by a DCaC-enabled application and automates the generation of compliant datasets that can be transferred to the cloud for centralized training and learning. This technique may be based on observing and sampling production data and their associated metadata (e.g., tags created and associated to different types of sensitive data as part of the DCaC process), along with a compliance-led dataset generation technique, which selectively combines synthetic, anonymized, and/or original data.

While there have been shown and described illustrative embodiments that provide automated data compliance and observability, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device, a request for training data that is based on application data generated by an application executed at a data collection node, wherein the application data is associated with a plurality of metadata identifiers;
   determining, by the device, one or more training data constraints that restrict use of the application data as training data;

generating, by the device, the training data in part by excluding application data of a particular type from being included in the training data based on a match between a metadata identifier of the plurality of metadata identifiers and the one or more training data constraints; and providing, by the device, the training data to be used to train a machine learning model.

2. The method as in claim 1, wherein the excluding the application data of the particular type from being included in the training data includes using the application data of the particular type to generate anonymized training data that is included in the training data.

3. The method as in claim 1, wherein the excluding the application data of the particular type from being included in the training data includes using the application data of the particular type to generate synthetic training data that is included in the training data.

4. The method as in claim 1, wherein the one or more training data constraints are based on a data manifest bonded to the application that includes a listing of the plurality of metadata identifiers.

5. The method as in claim 1, wherein the request includes an identifier of the application.

6. The method as in claim 5, wherein the one or more training data constraints are based on the identifier of the application.

7. The method as in claim 1, wherein the one or more training data constraints are based on a location of the data collection node.

8. The method as in claim 1, wherein the one or more training data constraints are based on a location of a receiver of the training data.

9. The method as in claim 1, further comprising:
obtaining, by the device, consent from one or more users for application data associated with the one or more users to be included in the training data.

10. The method as in claim 1, wherein the device is the data collection node.

11. An apparatus, comprising:
one or more network interfaces;
a processor coupled to the one or more network interfaces and configured to execute one or more processes; and
a memory configured to store a process that is executable by the processor, the process when executed configured to:
receive a request for training data that is based on application data generated by an application executed at a data collection node, wherein the application data is associated with a plurality of metadata identifiers;
determine one or more training data constraints that restrict use of the application data as training data;
generate the training data in part by excluding application data of a particular type from being included in the training data based on a match between a metadata identifier of the plurality of metadata identifiers and the one or more training data constraints; and
provide the training data to be used to train a machine learning model.

12. The apparatus as in claim 11, wherein the application data of the particular type is excluded from being included in the training data by using the application data of the particular type to generate anonymized training data that is included in the training data.

13. The apparatus as in claim 11, wherein the application data of the particular type is excluded from being included in the training data by using the application data of the particular type to generate synthetic training data that is included in the training data.

14. The apparatus as in claim 11, wherein the one or more training data constraints are based on a data manifest bonded to the application that includes a listing of the plurality of metadata identifiers.

15. The apparatus as in claim 11, wherein the request includes an identifier of the application.

16. The apparatus as in claim 15, wherein the one or more training data constraints are based on the identifier of the application.

17. The apparatus as in claim 11, wherein the one or more training data constraints are based on a location of the data collection node.

18. The apparatus as in claim 11, wherein the one or more training data constraints are based on a location of a receiver of the training data.

19. The apparatus as in claim 11, wherein the process when executed is further configured to:
consent from one or more users for application data associated with the one or more users to be included in the training data.

20. A tangible, non-transitory, computer-readable medium storing program instructions that cause a device to execute a process comprising:
receiving, at the device, a request for training data that is based on application data generated by an application executed at a data collection node, wherein the application data is associated with a plurality of metadata identifiers;
determining, by the device, one or more training data constraints that restrict use of the application data as training data;
generating, by the device, the training data in part by excluding application data of a particular type from being included in the training data based on a match between a metadata identifier of the plurality of metadata identifiers and the one or more training data constraints; and
providing, by the device, the training data to be used to train a machine learning model.

* * * * *